United States Patent [19]
Lee

[11] Patent Number: 5,983,653
[45] Date of Patent: Nov. 16, 1999

[54] REFRIGERATOR CAPABLE OF CONTROLLING FAN MOTOR

[75] Inventor: Chang-Ho Lee, Seoul, Rep. of Korea

[73] Assignee: Daewoo Electronics Co., Ltd., Seoul, Rep. of Korea

[21] Appl. No.: 08/998,276

[22] Filed: Dec. 24, 1997

[30] Foreign Application Priority Data

Dec. 27, 1996 [KR] Rep. of Korea ...................... 96-73807

[51] Int. Cl.⁶ ...................................................... F25D 17/00
[52] U.S. Cl. ................................................ 62/186; 62/408
[58] Field of Search ............................ 62/186, 180, 177, 62/179, 408; 236/DIG. 9, 49.3

[56] References Cited

U.S. PATENT DOCUMENTS 2,091,563  8/1937  Palmer ................................... 62/186 X
3,759,051  9/1973  Ohnishi ..................................... 62/180

*Primary Examiner*—Harry B. Tanner
*Attorney, Agent, or Firm*—Pillsbury Madison & Sutro LLP

[57] ABSTRACT

A refrigerator capable of controlling a fan motor, in which the fan motor rpm is controlled according to a cooling load, are disclosed. The refrigerator comprises a DC fan motor for operating a cooling fan; a controller for determining cooling load according to inner temperature of the refigerator sensed by thermal sensor and for generating a control signal to select an AC voltage according to the detemined cooling load; a transformer for decreasing an input voltage by several AC voltage levels; a switch for selecting a voltage level output from the transformer according to the control signal from the controller; and a rectifier for converting AC voltage to DC voltage and for supplying the DC voltage to the DC fan motor. According to the above, the rpm of the cooling fan can be varied and controlled easily depending on cooling load of the refrigerator using a DC fan motor.

4 Claims, 4 Drawing Sheets

REFRIGERATOR CAPABLE OF CONTROLLING FAN MOTOR

BACKGROUND OF THE INVENTION

1. Field of the Invention

The present invention relates to a fan motor in a refrigerator, and more particularly to a refrigerator capable of controlling a fan motor, in which the fan motor rpm is controlled according to a cooling load.

2. Prior Art

Generally, a refrigerator cooling system comprises a compressor for compressing a refrigerant, a condenser for condensing the compressed refrigerant radiating heat outward, a capillary tube for changing the condensed refrigerant into a low-temperature and low-pressure state, an evaporator for vaporizing refrigerant by absorbing heat in the refrigerator, and a cabinet having a freezer compartment and fresh food compartment which are partitioned from each other by a wall.

The cooling process of a conventional refrigerator is shown in FIG. 1. The refrigerant is compressed to high-temperature and high-pressure by a compressor 11 and is condensed by radiating heat outward at a condenser 12. The condensed refrigerant in the state of low-temperature and low-pressure passes through a capillary tube 13 and goes into an evaporator 14. The refrigerant is vaporized in the evaporator 14 by absorbing heat from surrounding air. The refrigerant passed through the evaporator 14 is inputted into the compressor 11 completing refrigerant circulation.

During the refrigerant circulation, heat is transferred from surrounding air to the refrigerant at the evaporator 14 and radiated outward at the condensor 12. The air surrounding the evaporator 14 cools by loosing heat, causing the cooling effect of a refrigerator.

The generated cool air is supplied to the freezer compartment and fresh food compartment by a cooling fan 15 for cooling the freezer compartment and fresh food compartment. A fan motor 16 operates the cooling fan 15 by a predetermined rpm, and the rate of cool air supply is controlled by the rpm of the fan motor 16.

An alternating current (AC) motor has been conventionally used to operate the cooling fan which is installed in the rear of the refrigerator. The rpm of the AC motor remains constant, regardless of the cooling load. Hence, the use of the AC motor offer little flexibility in circulating the cool air in the varying condition of the refrigerator.

That is, when the cooling load of the refrigerator increases, it is difficult to cool the refrigerator quickly with the AC motor, and to provide constant temperature environment for foods which are affected by variant temperature. Additionally, the AC motor maintained at high rpm consumes considerable amount of electric power even at the low cooling load of the refrigerator, causing inefficiency of the refrigerator.

SUMMARY OF THE INVENTION

It is an object of the present invention to provide a refrigerator capable of controlling a fan motor with a direct current (DC) voltage in which the rpm of the fan motor is controlled according to a cooling load.

To accomplish the above object, the present invention provides a refrigerator comprising a DC fan motor for operating a cooling fan, at least one thermal sensor for sensing inner temperature of the refrigerator, a controller for determining a cooling load on the basis of the inner temperature sensed by the thermal sensor and for generating a control signal for selecting an AC voltage according to the determined cooling load, a transformer for decreasing power source voltage by several AC voltages, a switch for selecting an AC voltage among the several AC voltages outputted from the transformer according to the control signal of the controller, and a rectifier for converting the AC voltage selected by the switch to a DC voltage and for supplying the DC voltage to the DC fan motor.

According to the present invention, when the cooling load increases due to rising temperature in the refrigerator, a high voltage is supplied to the fan motor for rotating the cooling fan at high rpm. And conversely, when the cooling load is small, a low voltage is supplied to the fan motor for rotating the cooling fan at low rpm.

The rpm of the cooling fan is controlled easily for implementing an appropriate rpm for corresponding cooling load of the refrigerator by using the DC motor to operate the cooling fan. As a result, the cooling time of the refrigerator is effectively controlled and the efficiency of the refrigerator is enhanced.

BRIEF DESCRIPTION OF THE DRAWINGS

The present invention will be better understood and its various objects and advantages will be more fully appreciated from the following description taken in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference number will be used throughout the drawings to refer to the same or like parts.

Figure 1:
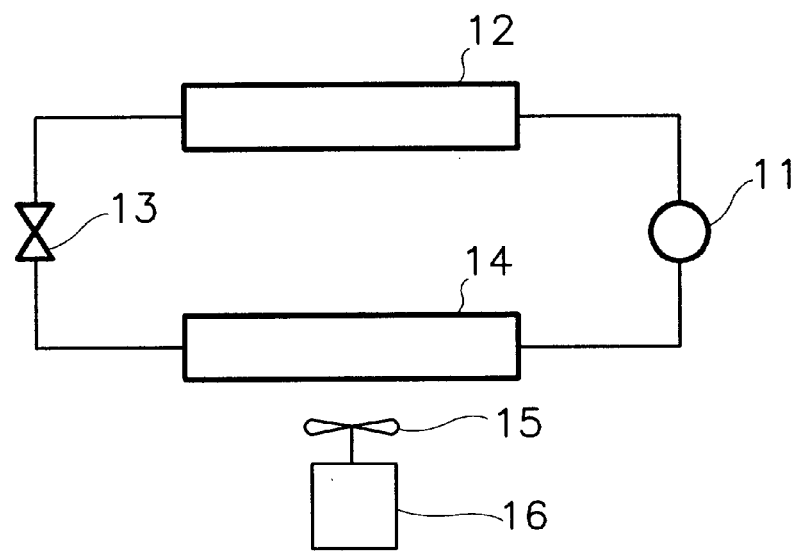
FIG. 1 is a circulation chart of a refrigerant in a conventional refrigerator.
Figure 2:
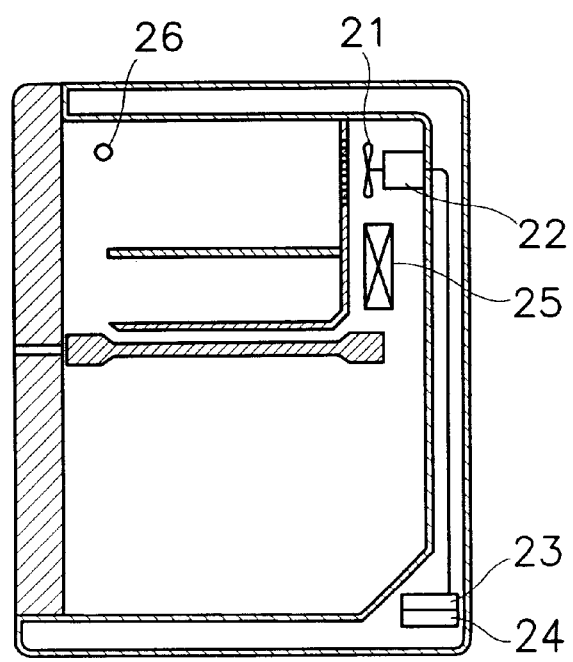
FIG. 2 is a cross-sectional view of a refrigerator according to the present invention.

FIG. 2 shows a cross-sectional view of a refrigerator according to the present invention. The refrigerator comprises a fan motor 22 for rotating a cooling fan 21, a transformer 23 for decreasing power source voltage by several AC voltage levels, and a rectifier 24 for converting AC voltage to DC voltage to be supplied to the fan motor 22. The fan motor 22 used in this present invention is a DC motor and its rpm is variable according to DC voltage which in turn is varied by a cooling load.

At least one thermal sensor 25 is installed in the freezer compartment and/or the fresh food compartment, and the temperature sensed in the thermal sensor 25 is provided to a controller (not shown) for determining a cooling load.

Figure 3:
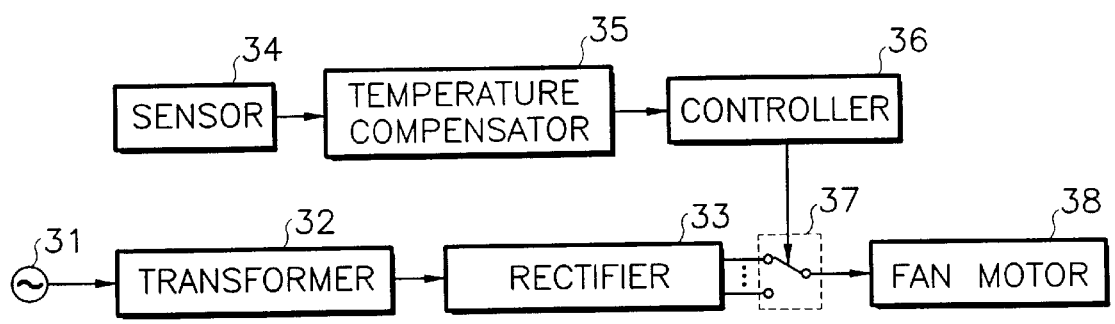
FIG. 3 is a block diagram of a first preferred embodiment of the control system of a refrigerator according to the present invention.

A first embodiment of the control system of a refrigerator according to the present invention, as shown in FIG. 3, comprises a power source 31, a transformer 32, a rectifier 33, a thermal sensor 34, a temperature compensator 35, a controller 36, a switch 37, and a fan motor 38.

The transformer 32 provides the rectifier 33 with AC voltage provided from the power source 31 after dropping to a predetermined AC voltage. The rectifier 33 converts AC voltage outputted from the transformer 32 to DC voltage; for example, the rectifier 33 outputs 25V, 17V and 12V DC voltages for the predetermined AC voltage supplied from the transformer 32, and the number and the value of DC voltage outputted can be easily varied.

At least one thermal sensor 34 installed in the freezer compartment and/or the fresh food compartment senses the inner temperature of the refrigerator and supplies the sensed inner temperature to the temperature compensator 35. The temperature compensator 35 compensates the sensed inner temperature by thermal sensor 34 to an actual inner tempertaure and supplies the compensated inner temperature to the controller 36. The controller 36 determines the cooling load of the refrigerator on the basis of the compensated inner temperature, and provides the switch 37 with a control signal according to the determined cooling load.

The switch 37 connects the terminal of the rectifier 33 to a fan motor 38 to switch proper DC voltage according to the control signal. The rpm of the fan motor 38 is varied according to the DC voltage supplied for controlling the cooling fan (21 in FIG. 2) at high, normal, low, and stop mode.

Figure 4:
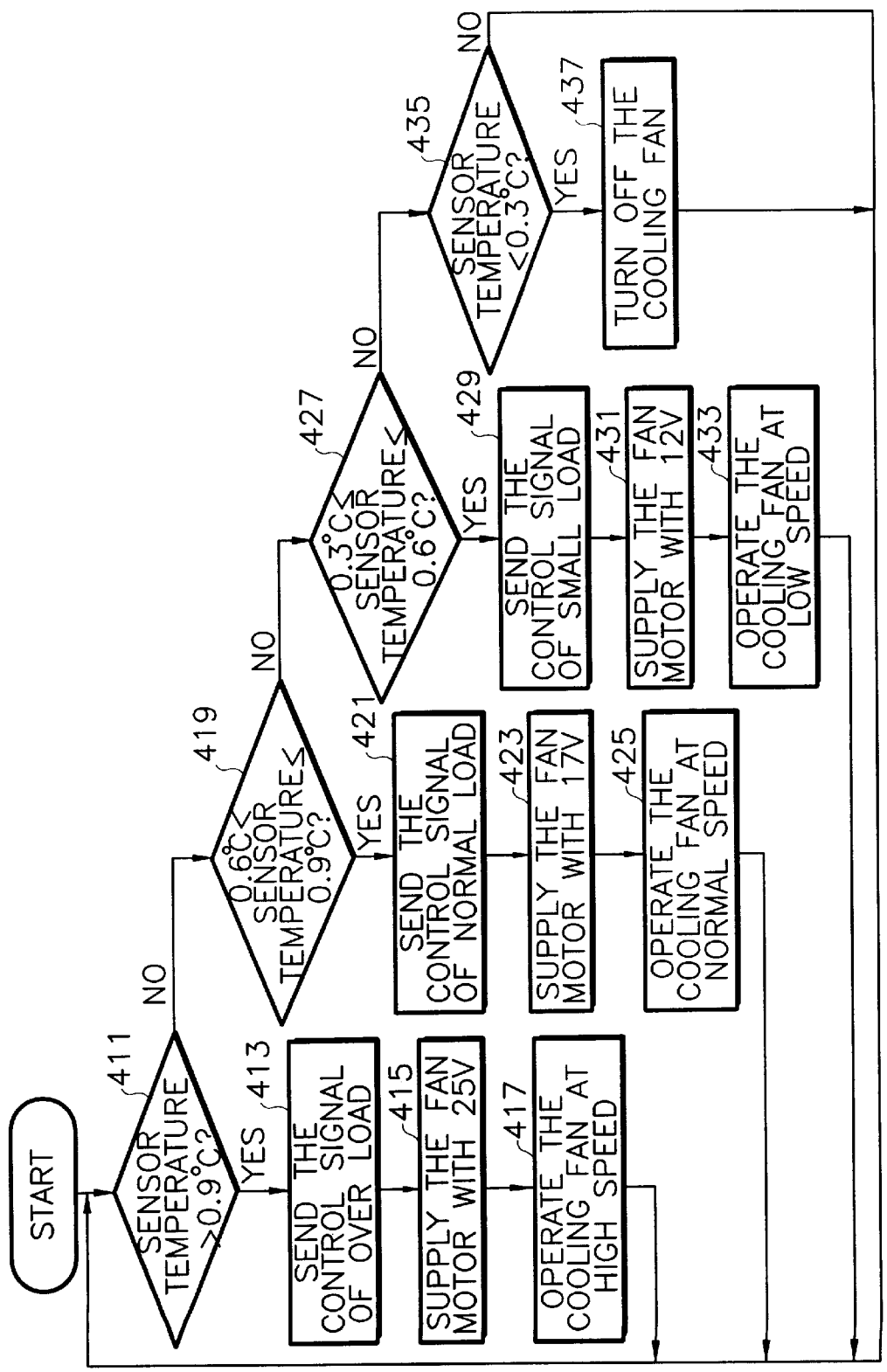
FIG. 4 is a flow chart showing steps of controlling fan motor in a refrigerator according to the present invention.

Meanwhile, the method of controlling fan motor for cooling, as shown in FIG. 4, comprises the steps 411, 413, 419, 421, 427, 429 and 435 of determining one of cooling load from over load, normal load, small load, and unloading by sensing inner temperature of the refrigerator, and the steps 415, 417, 423, 425, 431, 433 and 437 of controlling the rpm of the fan motor for each high, normal, low speed, and stop mode of the fan motor by changing DC voltage being supplied to the fan motor according to the determined cooling load.

The method of controlling the fan motor according to the first embodiment of the present invention is explained below by referring to FIGS. 3 and 4.

It is assumed that the thermal sensor 34 is installed, for example, on the wall of the compartment vegetable compartment of the fresh food compartment. In order to maintain the temperature of the compartment within the desired range of 2° C. to 3° C., the thermal sensor 34 is set at the range of 0.6° C. to 0.9° C. to closely monitor the temperature change in the compartment within this range.

The controller 36 determines the cooling load of the refrigerator as one of over load, normal load, small load, and unloading on the basis of the inner temperature sensed by the thermal sensor 34. That is, the controller 36 selects the overload, if the inner temperature is higer than 0.9° C.; selects the normal load, if the inner temperature is between 0.6° C. to 0.9° C.; selects the small load, if the inner temperature is between 0.3° C. to 0.6° C.; and selects the unloading if the inner temperature is less than 0.3° C. as a cooling load to control the fan motor 38.

For controlling the rpm of the fan motor 38, the controller 36 provides the switch 37 with the control signal to select an appropriate DC voltage corresponding to the determined cooling load, and operates the cooling fan (21 in FIG. 2) to rotate at high, normal, or low speed mode according to the selected DC voltage.

First, if the inner temperature sensed by thermal sensor 34 is higher than 0.9° C., the controller 36 determines the over load as the cooling load, and provides the switch 37 with the control signal to select 25V from the several DC voltages outputted from the rectifier 33 (the steps 411 and 413 in FIG. 4). The fan motor 38 provided with DC 25V operates the cooling fan 21 by rotating at high speed (steps 415 and 417). The cool air is rapidly circulated in the fresh food or freezer compartment by the high rotation of the cooling fan 21 for fast cooling.

Second, if the inner temperature sensed by thermal sensor 34 is between 0.6° C. to 0.9° C., the controller 36 determines the normal load as the cooling load and provides the switch 37 with the control signal for the switch 37 to select 17V from the several DC voltages outputted from the rectifier 33 (the steps 419 and 421). The fan motor 38 provided with DC 17 V operates the cooling fan 21 by rotating at normal speed (steps 423 and 425). In the normal cooling load, the inner temperature of the refrigerator decreases in normal speed.

Third, if the inner temperature sensed by thermal sensor 34 is between 0.3° C. to 0.6° C., the controller 36 determines the small load as the cooling load and provides the switch 37 with the control signal to select 12V from the several DC voltages outputted from the rectifier 33 (steps 427 and 429). The fan motor 38 provided with DC 12V operates the cooling fan 21 by rotating at low speed (steps 431 and 433). In the low cooling load, the cooling fan 21 rotates at lower rpm than the normal rpm and consumes less electric power.

Fourth, if the inner temperature sensed by thermal sensor 34 is less than 0.3° C., the controller 36 determines the unloading as the cooling load and stops the cooling fan 21 (steps 435 and 437).

In the preferred embodiments of the present invention, the rpm of the cooling fan is 3600, if the DC voltage provided to the fan motor is 25V; 3000 rpm at 17V; 2300 rpm at 12V; and 2000 rpm at 8V. However, the conventional fan motor using AC voltage only has the constant rpm of 2000, when provided with AC 220V. By utilizing DC fan motor, the rpm of the fan motor can be varied, enabling the refrigerator to control the rpm of the fan motor within the range appropriate for the corresponding cooling load.

Figure 5:
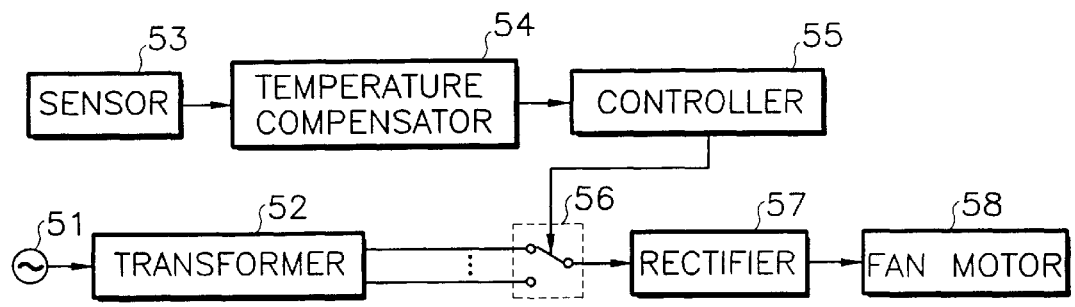
FIG. 5 is a block diagram of a second preferred errmbodiment of the control system of a refrigerator according to the present invention.

A second preferred embodiment of the control system of a refrigerator according to the present invention, as shown in FIG. 5, comprises of a power source 51, a transformer 52, a thermal sensor 53, a temperature compensator 54, a controller 55, a switch 56, a rectifier 57, and a fan motor 58. Here, compared to the first embodiment of the present invention, the transformer 52 has multiple output voltages, and one of these multiple output voltages is switched by the switch 56. That is, the transformer 52 provides the rectifier 57 with multiple AC voltages after dropping the AC voltage by several levels. The switch 56 selects one of the AC voltages provided from the transformer 52 according to the control signal from the controller 55. The rectifier 57 converts the AC voltage from the transformer 52 to DC voltage; for example, the rectifier 57 outputs 25V, 17V and 12V of DC voltage for each of the corresponding AC voltage outputted from the transformer 52. Similar to the first preferred embodiment of the present invention, these processes are carried out according to the method of controlling the fan motor as shown in FIG. 4.

Comparative tests were carried out for a DC fan motor controlled according to the present invention and a conventional AC fan motor, each utilized in a refrigerator of 600 ml in size. And the results are as follows. For the present invention, the time required to change the temperature of the freezer compartment to −5° C. from 30° C., or to change the temperature of the fresh food compartment to 10° C. from 30° C., was 100 minutes. By comparison, it took 130 minutes for the conventional AC fan motor for the same condition.

According to the present invention, if the cooling load increases due to rising temperature in the refrigerator, a high DC voltage is supplied to the DC fan motor for rotating the cooling fan at high rpm. And if the cooling load decreases, a low voltage is supplied to the fan motor for rotating the cooling fan at low rpm.

The rpm of the cooling fan can be varied and controlled easily according to cooling load of the refrigerator by using a DC motor. As a result, the cooling time of the refrigerator is controlled effectively, enhancing the efficiency of the refrigerator by consuming less electric power which is responsive to the varying rpm of the fan motor.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A refrigerator comprising:

a DC fan motor for operating a cooling fan;

at least one thermal sensor for sensing an inner temperature of the refrigerator;

a controller for determining a cooling load of the refrigerator as one of overload, normal load, small load, and unloading on the basis of the inner temperature sensed by said thermal sensor, and for generating a control signal to select an AC voltage according to the determined cooling load so as to control the rpm of said DC fan motor as one of high, normal, low, and stop modes;

a transformer for decreasing a power source voltage to several AC voltages;

a switching means for selecting one of the several AC voltages outputted from said transformer according to the control signal from said controller; and a rectifier for converting the AC voltage selected by said switching means to a DC voltage and for supplying the DC voltage to said DC fan motor.

2. The refrigerator of claim 1, wherein the refrigerator further comprises a temperature compensator for compensating the inner temperature sensed by said thermal sensor to an actual inner tempertaure and supplying the compensated inner temperature to said controller.

3. A refrigerator comprising:

a DC fan motor for operating a cooling fan;

at least one thermal sensor for sensing an inner temperature of the refrigerator;

a controller for determining a cooling load of the refrigerator as one of overload, normal load, small load, and unloading on the basis of the inner temperature sensed by said thermal sensor, and for generating a control signal to select a DC voltage according to the determined cooling load so as to control the rpm of said DC fan motor as one of high, normal, low, and stop modes;

a transformer for decreasing a power source voltage to a predetermined AC voltage;

a rectifier for converting the AC voltage supplied from said transformer to several DC voltages; and a switching means for selecting one of the several DC voltages outputted from said rectifier according to the control signal from said controller and for supplying the selected DC voltage to said DC fan motor.

4. The refrigerator of claim 3, wherein the refrigerator further comprises a temperature compensator for compensating the inner temperature sensed by said thermal sensor to an actual inner tempertaure and supplying the compensated inner temperature to said controller.

* * * * *